United States Patent [19]

Williams et al.

[11] 3,922,904

[45] Dec. 2, 1975

[54] METHOD AND APPARATUS FOR DETECTING DISSOLVED GASES IN LIQUIDS

[75] Inventors: Dale D. Williams, Mc Lean, Va.; Roman R. Miller, Silver Spring, Md.

[73] Assignee: The United States of America as represented by the Secretary of the Navy, Washington, D.C.

[22] Filed: Oct. 2, 1962

[21] Appl. No.: 227,959

[52] U.S. Cl. .................................................. 73/19
[51] Int. Cl.² ........................................... G01N 7/00
[58] Field of Search ................................. 73/27, 19; 55/244–247, 53, 18

[56] References Cited
UNITED STATES PATENTS

| | | | |
|---|---|---|---|
| 632,370 | 9/1899 | Rossler | 55/247 X |
| 2,514,690 | 7/1960 | Bliss et al. | 55/63 X |
| 2,636,569 | 4/1953 | Smith | 73/27 X |
| 2,987,912 | 6/1961 | Jacobson | 73/19 |
| 3,097,518 | 7/1963 | Taylor et al. | 73/27 X |

FOREIGN PATENTS OR APPLICATIONS

| | | | |
|---|---|---|---|
| 730,504 | 5/1932 | France | 73/27 |
| 15,675 | 12/1933 | Australia | 55/247 |

*Primary Examiner*—Leland A. Sebastian
*Assistant Examiner*—Edward A. Miller
*Attorney, Agent, or Firm*—R. S. Sciascia; Arthur L. Branning

[57] ABSTRACT

1. A method of detecting and measuring the quantity of a gas dissolved in a liquid which comprises, flowing a carrier gas for displacing the dissolved gas from the liquid over a flowing body of the liquid in a confined cylindrical zone at carrier gas-to-liquid ratios of from 10 to 1 through 1 to 2 and flow rates therefor of up to about 100 cc per minute, continuously lifting films of the liquid into and across the flowing carrier gas to effect displacement of the dissolved gas from the liquid and formation of a mixture of the carrier gas and displaced dissolved gas and flowing said mixed gas through an operating thermal conductivity cell to relate the thermal conductivity of said mixed gas to that of the carrier gas.

8 Claims, 2 Drawing Figures

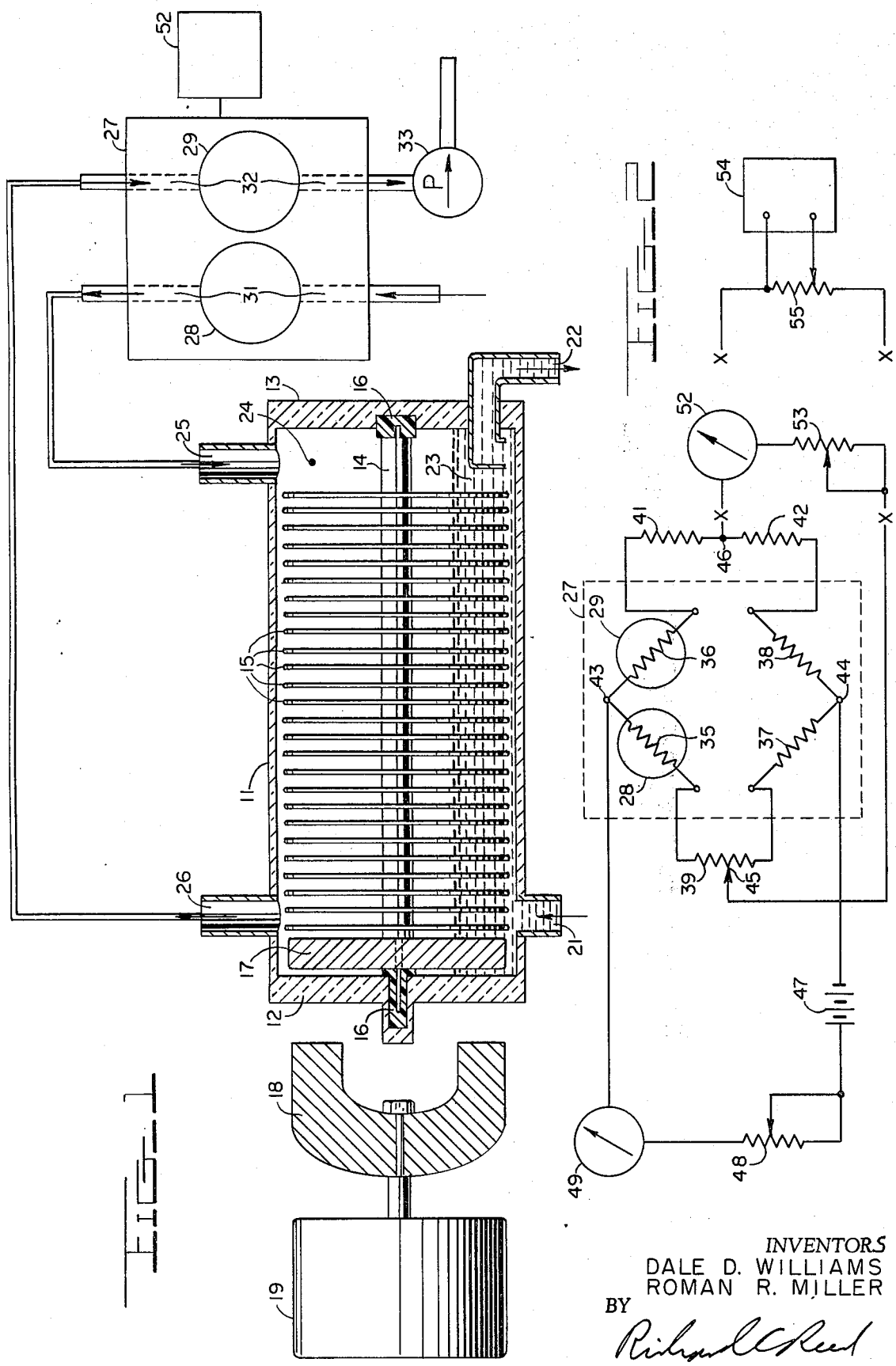

METHOD AND APPARATUS FOR DETECTING DISSOLVED GASES IN LIQUIDS

The invention described herein may be manufactured and used by or for the Government of the United States of America for governmental purposes without the payment of any royalties thereon or therefor.

The invention relates to an improved method and apparatus for determining the concentration of dissolved gases in liquids. More particularly, this invention relates to an apparatus for detecting gases dissolved in liquids and to the detection of submarine wakes by means of gases which are discharged from the submarines as waste materials.

Determination of the dissolved gases in the world's oceans provide valuable information in oceanography and in naval warfare. Sampling of sea water at various depths requires close control of liquid and gas flow to obtain substantially all of the dissolved gases in a relatively small, undiluted volume suitable for gas analysis. Previous methods of separation involved stripping columns, the use of high vacuum and rapid agitation, but these methods were neither effective in purging liquids rapidly nor efficient where continuous monitoring of the stripped gases is desired. Previous methods, moreover, cause considerable turbulence and pressure changes at the output, resulting in anomalous performance of a sensitive analytical instrument.

According to the invention, a combined apparatus provides both gas separation from water or other liquids and continuous monitoring of separated gases to detect the presence of a determined gas and also to indicate its amount. The present combined apparatus is capable of stripping dissolved gases rapidly in a single pass without gas bubbling or other disturbances, and in addition, provides a smooth gaseous sample which is introduced through suitable detecting means, such as a thermal conductivity cell, in a continuous manner.

The invention is also based on the finding that dissolved hydrogen gas in navigable waters may indicate the wake of a submarine. Atomic submarines may lurk underwater for long periods; their continuous underwater existence require a large replenishment of oxygen in the breathing atmosphere. Submarines are therefor equipped with electrolytic oxygen generators for the decomposition of water as a source of oxygen, while dumping the hydrogen generated in the same process into the sea as gaseous waste. Therefore, hydrogen which is not normally encountered in sea water is released in appreciable quantities from a submarine. The amount of hydrogen which may be released by a Polaris submarine, for example amounts to an average of about 180 cubic feet per hour. Significantly, the hydrogen gas released from a submarine remains detectable until it becomes highly diluted or escapes from the surface of the water.

It is therefore an object of the present invention to provide a continuous method of stripping and determining the concentration of a particular gas which is dissolved in a liquid.

It is a further object of this invention to provide an apparatus which may be employed for continuous monitoring of water or other liquid to determine the presence and the amount of hydrogen therein.

Another object of this invention is to provide an efficient apparatus which is capable of rapidly stripping the gases from a liquid sample and analyzing the discharged gas content for a particular gas.

A further object of this invention is to provide a method for detecting the wake of a submarine which discharges hydrogen into the sea.

Other objects and advantages of this invention will hereinafter become more fully apparent from the following detailed description of a preferred embodiment of the invention when considered in connection with the accompanying drawing.

The present invention provides a novel technique for detecting the gaseous content of a liquid; said technique involves a moving gas phase over a liquid phase. The liquid is brought into intimate contact with the gas by repeatedly exposing thin films of liquid to the moving gas. Dissolved gases in the film are displaced by the moving gas, and the stripped films are returned to the liquid body. By constant renewal of the liquid films the rate of gaseous exchange is very rapid.

The moving gas phase serves as the carrier gas for conveying the stripped gases to the detector unit. The mixture of carrier gas and stripped gases are passed continuously into the detector, which is preferably a thermal conductivity cell. The carrier gas may be any inert gas with a thermal conductivity markedly different from that of the gas to be determined. Nitrogen with a thermal conductivity nearly one-seventh that of hydrogen is a suitable carrier gas when hydrogen is to be detected.

The combined apparatus in accordance with the present method for stripping and detecting gases dissolved in liquids comprises a stripper unit having a series of wettable elements partly submerged in liquid and rotatable means that spin the series of elements in and out of the liquid for wetting said elements over the entire surface thereof with a thin liquid film. A thermal conductivity cell with a reference channel and a detector channel is connected to the stripper unit by gas conduits, and indicating means for receiving thermal conductivity cell signals provides qualitative and quantitative analysis of a particular gas.

The invention will be explained more fully with reference to the accompanying drawing in which FIG. 1 shows a somewhat diagrammatic view of a preferred embodiment of the present apparatus in which the spinning-disk stripper is in detailed vertical cross section;

FIG. 2 shows a wiring diagram of one embodiment of a thermal conductivity cell which may be employed in the present invention.

Referring now to the drawing, there is shown in FIG. 1, a cylindrical housing 11 having a closed front end 12 and rear end 13 and in which a shaft 14 is rotatably mounted on the ends of said housing. A plurality of vertically disposed disks 15 formed of any suitable wettable material, such as mylar or nylon composition, glass, stainless steel, etc., are arranged in relatively close manner to provide a substantially large surface area. Bearings 16 inserted in the ends of said housing provide ease in rotating the shaft and disk assembly by magnetic coupling means, which includes an inner magnet 17 and a drive magnet 18 rotated by a motor 19.

An inlet 21 allows a liquid sample to enter the housing, while an outlet 22 provides for the removal of purged liquid from the housing. The liquid layer 23 is maintained at approximately one-fourth the volume of said housing. The rest of the housing is filled with a carrier gas 24, which is moving through said housing at a low constant rate; the gas enters the housing though carrier gas line 25 and leaves by way of carrier gas line 26. The carrier gas should be of an inert composition with respect to the liquid phase and is chosen with regard to its thermal conductivity property, as will be explained later herein.

Carrier gas lines 25 and 26 are connected to a thermal conductivity cell 27 which includes a reference cell 28 and a detector cell 29. The reference and detector cells comprise gas channels 31 and 32, respectively, into which a glass bead thermistor or a hot wire cell (not shown) is inserted to respond to thermal changes, as is well known in the art.

A suction pump 33 provides means for drawing the gas through the apparatus. A suitable pump which may be used for this purpose is the one entitled Gas Sampler in U.S. Pat. No. 3,093,001 issued June 11, 1963 to Dale D. Williams, who is also one of the applicants herein. As the gas propelling means, there may be utilized for a portable apparatus a high pressure gas cylinder in place of the suction pump, the compressed air being introduced into the apparatus through gas channel 31.

The wiring diagram of FIG. 2 shows the manner in which the thermal conductivity cell 27 is electrically connected. A Wheatstone bridge is preferably employed in which one current path of the bridge includes the reference cell 28, a compensating resistor 39 and a fixed reference resistor 37. The other current path of the bridge includes the detector cell 29, balancing resistors 41 and 42, and a fixed reference resistor 38. The cells as shown in the diagram are equipped with glass bead thermistors 35 and 36, which are one type of devices that undergo resistance change with variations in temperature. The compensating resistor 39 is chosen to cover the range of variations that may occur in the detector cell 29. Along each current path there is defined a balance point: in one current path the balance point is the sliding arm contact 45 in the compensating resistor 39, and in the other current path the balancing point is at 46 between the balancing resistors 41 and 42.

A source of direct current 47 is connected to the bridge at the driving points 43 and 44. The fixed resistors 37 and 38 are alike and their resistance is chosen to provide a significantly different voltage level at points 45 and 46 than exists at the driving points 43 and 44. In the operation of the apparatus the sliding arm contact 45 is adjusted initially to the point where there is no voltage difference between balance points 45 and 46.

In series with the electric source is a current monitoring meter 49 and a current limiting resistor 48 which prevents overloading the meter. An indicating instrument 52 inserted in the bridge connection is current responsive to unbalances of the bridge. A current limiting resistor 53 protects the instrument from excess current.

The diagram in FIG. 2 further illustrates the use of a voltage-operated device 54, for example, a recorder, indicating instrument or any suitable form of activating device, in place of the indicating instrument 52, mentioned above. Such a device is preferably in parallel arrangement with a voltage limiting resistor 55 in order to safeguard said device from excess voltage.

A specific example of a suitable thermal conductivity cell in accordance with the present invention employs thermistors 9677 (AEL) manufactured by the Gow-Mac Instrument Co. of Madison, N.J. The compensating resistor 39 may preferably be of 100 ohms, while the fixed resistors 37 and 38 are rated at 500 ohms. The balancing resistors 41 and 42 are each of 50 ohms, and the current limiting resistor 48 is preferably of 2000 ohms. The current monitoring meter 49 is adjusted to provide preferably a thermal conductivity cell current of about 6 milliamperes. A suitable voltage-operated recorder 54 has a range of 10 millivolts at full scale recording.

The carrier gas which is provided in the present apparatus performs two distinct functions: (1) In the stripping unit a stream of gas displaces the gases which are dissolved in the liquid, and (2) the gas is compared in a thermal conductivity cell with the gas mixture transferred from the stripping unit. The carrier gas, therefore, must have a thermal conductivity substantially different from that of the gas to be determined. For example, if the gas to be determined has a low thermal conductivity, such as oxygen or nitrogen, a gas of high thermal conductivity, such as helium may be employed. Analysis for dissolved hydrogen gas may be effectively carried out by employing argon, or nitrogen or air as the carrier gas of the system. The thermal conductivity of hydrogen differs from argon by a factor of 10 and from nitrogen or air by a factor of 7, and any of these inert gases will provide a high sensitivity for determining hydrogen in a thermal conductivity cell.

Air is an ideal carrier gas for the present apparatus since its composition is nearly the same as the dissolved gas content in sea water. Air is in equilibrium with the dissolved gases in sea water; the use of air as a carrier gas, therefore, cancels any error from the presence of other gases in sea water.

The present apparatus operates as follows:

When the dissolved gas content of water is to be stripped and analyzed for a specific gas, for example, the presence and amount of hydrogen in water, a carrier gas of low thermal conductivity is used. Nitrogen, as previously mentioned, is employed as the carrier gas and it is drawn into the apparatus through the inlet gas channel 31. The gas passes through the reference cell 28, through the gas conduit to the stripper unit and by a return gas conduit to the detector cell 29. The thermal conductivity cell is actuated by closing the circuit to a 12 volt DC line and adjusting the meter 49 to deliver 6 milliamperes to the bridge circuit. The water sample to be analyzed is introduced into the stripper housing to a level of about one-fourth the volume of said housing. Motor 19 is then actuated and the disk assembly is rotated at about 280 rpm. At this point water flow is temporarily interrupted to zero the instrument 52. Cessation of water flow allows the carrier gas to strip the water of its hydrogen, thus the zero adjustment accounts for all variables except the presence of hydrogen which is to be determined. The sliding arm contact 45 of resistor 39 is adjusted until a zero reading is obtained in the instrument 52. Water flow is then resumed. As the disks rotate through the water, a thin film of liquid is spread over their surfaces and exposed to the gas phase. A gaseous exchange occurring in the film displaces the dissolved hydrogen with nitrogen.

The carrier gas initially is present in both the reference and detector cells, but as the stripper unit removes the dissolved hydrogen, a mixture of nitrogen and hydrogen is introduced into the detector cell. The thermal change that takes place in the detector cell as a result of the gas mixture will vary the resistance of the cell and consequently an unbalance will occur in the output of the bridge circuit.

Essentially 100 percent gas removal may be obtained with carrier gas to sample ratios of 10 to 1 through 1 to 2 with flow rates of up to about 100 cc per minute for both sample and carrier gas.

Due to the speedy response of the present apparatus, a change in the hydrogen content of sea water in the range of 0.004 cc up to saturation of about 16.2 cc at STP of hydrogen per liter of sea water may readily be detected initially in about 3 minutes. The apparatus will then continue to detect continuously as long as sample is being provided. By calibrating the output of the cell the exact content of hydrogen may be determined, the recording scale being "straight line uniform" for this range of concentration.

The present apparatus provides continuous monitoring of a liquid to identify and measure a particular gas. Previous chromatographs which employ thermal conductivity cells separate a fluid mixture into its components over a time interval. Such devices cannot be used for continuous information about the presence and amount of a single gas.

The technique and apparatus described herein may be applied to the analysis of water which should provide valuable data for the Navy and for oceanography. With direct outboard sampling on surface vessels and submarines, sampling and analyzing sea water samples at the source provides rapid efficient identification which cannot be accomplished by previous procedures.

Obviously many modifications and variations of the present invention are possible in the light of the above teachings. It is therefore to be understood that within the scope of the appended claims the invention may be practiced otherwise than as specifically described.

What is claimed is:

1. A method of detecting and measuring the quantity of a gas dissolved in a liquid which comprises, flowing a carrier gas for displacing the dissolved gas from the liquid over a flowing body of the liquid in a confined cylindrical zone at carrier gs-to-liquid ratios of from 10 to 1 through 1 to 2 and flow rates therefor of up to about 100 cc per minute, continuously lifting films of the liquid into and across the flowing carrier gas to effect displacement of the dissolved gas from the liquid and formation of a mixture of the carrier gas and displaced dissolved gas and flowing said mixed gas through an operating thermal conductivity cell to relate the thermal conductivity of said mixed gas to that of the carrier gas.

2. A method as defined in claim 1, wherein the liquid is sea water, the gas dissolved therein is hydrogen and the carrier gas is air.

3. An apparatus for detecting and measuring a dissolved gas in a liquid under conditions of substantially continuous flow comprising in combination:
    a gas stripper which includes a housing adapted to maintain a relatively low level of liquid sample in contact with a flow of carrier gas,
    a plurality of disks spaced from each other and mounted on a rotatable shaft, the lower part of said disks extending below said liquid level,
    means for rotating said disks,
    a reference cell and a detector cell in a measuring bridge circuit,
    said reference cell being in one current path of said bridge and said detector cell being in the other current path thereof,
    a passage through said reference cell for passing the carrier gas flow through said cell, said passage having an inlet connected to a source of carrier gas and an outlet connected to said housing,
    a passage through said detector cell for passing a gas flow mixture from said housing through said cell, said passage having an inlet connected to said housing and an outlet connected to a suction pump for drawing carrier gas through said apparatus.

4. An apparatus as disclosed in claim 3 in which the carrier gas is air.

5. An apparatus for detecting and measuring a dissolved gas in a liquid under conditions of substantially continuous sample flow comprising in combination:
    a gas stripper which includes a cylindrical housing adapted to maintain a relatively low level of liquid sample in contact with a flow of carrier gas,
    a plurality of spaced disks, center-mounted on an axial shaft supported at the ends of said housing, the lower part of said disks extending below said liquid level,
    magnetic coupling means for rotating said shaft,
    a reference cell and a detector cell in a measuring bridge circuit,
    said reference cell being in one current path of said bridge and said detector cell being in the other current path thereof,
    a passage through said reference cell for passing the carrier gas flow through said cell, said passage having an inlet connected to a source of carrier gas and an outlet connected to said housing,
    a passage through said detector cell for passing a gas flow mixture from said housing through said cell, said passage having an inlet connected to said housing and an outlet connected to a suction pump for drawing carrier gas through said apparatus.

6. An apparatus for detecting and measuring a dissolved gas in a liquid under conditions of substantially continuous sample flow comprising in combination:
    a gas stripper which comprises cylindrical housing, adapted to maintain a relatively low level of liquid sample in contact with a flow of carrier gas, a plurality of spaced disks therein mounted on an axial shaft, the lower part of said disks extending below said liquid level,
    magnetic coupling means for rotating said shaft, a reference cell and a detector cell in a measuring bridge circuit,
    said reference cell being in one current path which includes a compensating resistor and a first fixed reference resistor,
    said detector cell being in the other current path which includes a pair of balancing resistors and a second fixed reference resistor and means for indicating the unbalanced condition in said bridge circuit,
    a passage through said reference cell for passing the carrier gas flow through said cell, said passage having an inlet connected to a source of carrier gas and an outlet connected to said stripper, and
    a passage through said detector cell for passing a gas flow mixture from said housing through said cell, said passage having an inlet connected to said stripper and an outlet connected to a suction pump for drawing carrier gas through said apparatus.

7. An apparatus for detecting and measuring a dissolved gas in a liquid under conditions of substantially continuous sample flow comprising in combination:
   a gas stripper which comprises a cylindrical housing, adapted to maintain a relatively low level of liquid sample in contact with a flow of carrier gas,
   a plurality of spaced disks therein mounted on an axial shaft, the lower part of said disks extending below said liquid level, said shaft having a permanent magnet affixed at one of its ends,
   rotating means including an electromagnet in coupling arrangement with said magnet,
   a reference cell and a detector cell in a measuring bridge circuit, said reference cell being in one arm of one current path of said circuit and said detector cell being in one arm of the other current path of said circuit and fixed reference resistors being in the remaining arms of said current paths,
   means for continuous indication of the unbalance in the output of the bridge circuit,
   a passage through said reference cell for passing the carrier gas flow through said cell, said passage having an inlet connected to a source of carrier gas and an outlet connected to said stripper, and
   a passage through said detector cell for passing a gas flow mixture from said housing through said cell, said passage having an inlet connected to said stripper and an outlet connected to an exhaust.

8. An apparatus for detecting and measuring a dissolved gas in a liquid under conditions of substantially continuous sample flow comprising in combination:
   a gas stripper which comprises a cylindrical housing adapted to maintain a relatively low level of liquid sample in contact with a flow of carrier gas,
   a plurality of spaced disks formed of a plastic composition, said disks being mounted on an axial shaft,
   bearings at each end of said housing for mounting said shaft, a permanent magnet affixed at one end of said shaft,
   rotating means including an electromagnet in coupling arrangement with said magnet,
   a reference cell and a detector cell in a measuring bridge circuit, said reference cell being in one current path with a compensating resistor and a first fixed reference resistor, said detector cell being in the other current path with a pair of balancing resistors and a second fixed reference resistor,
   an indicating instrument in said bridge between said compensating resistor and said balancing resistors and between said balancing resistors and current responsive to unbalances in the bridge,
   a passage through said reference cell for passing the carrier gas flow over said cell, said passage having an inlet connected to a source of carrier gas and an outlet connected to said housing, and
   a passage through said detector cell for passing a gas flow mixture from said housing through said cell, said passage having an inlet connected to said housing and an outlet connected to an exhaust.

* * * * *